(12) United States Patent
Peacock et al.

(10) Patent No.: US 8,538,126 B2
(45) Date of Patent: Sep. 17, 2013

(54) METHOD AND APPARATUS FOR THE AUTOMATIC GRADING OF CONDITION OF LIVESTOCK

(75) Inventors: Andrew M. Peacock, Musselburgh (GB); Oliver Lewis, Broxburn (GB); Jeffrey M. Bewley, Lexington, KY (US)

(73) Assignee: Icerobotics, Ltd.

( * ) Notice: Subject to any disclaimer, the term of this patent is extended or adjusted under 35 U.S.C. 154(b) by 927 days.

(21) Appl. No.: 12/195,918

(22) Filed: Aug. 21, 2008

(65) Prior Publication Data
US 2009/0074253 A1   Mar. 19, 2009

(30) Foreign Application Priority Data
Aug. 22, 2007 (GB) .................................. 0716333.0

(51) Int. Cl.
*G06K 9/00* (2006.01)

(52) U.S. Cl.
USPC ........... 382/141; 382/116; 382/195; 382/204; 382/100

(58) Field of Classification Search
USPC ................. 382/100, 103, 110, 116, 199, 195, 382/202–204, 286
See application file for complete search history.

(56) References Cited

U.S. PATENT DOCUMENTS

| | | | |
|---|---|---|---|
| 4,078,313 A | 3/1978 | Hennessy | |
| 4,270,274 A | 6/1981 | Hennessy | |
| 4,463,353 A | 7/1984 | Kuzara | |
| 4,532,892 A | 8/1985 | Kuzara | |
| 4,745,472 A | 5/1988 | Hayes | |
| 4,917,117 A | 4/1990 | Brom et al. | |
| 5,140,988 A | 8/1992 | Stouffer et al. | |
| 5,353,796 A | 10/1994 | Schroeder et al. | |
| 5,412,420 A | 5/1995 | Ellis | |
| 5,458,418 A | 10/1995 | Jones et al. | |
| 5,474,023 A | 12/1995 | Khodabandehloo et al. | |
| 5,474,085 A | 12/1995 | Hurnik et al. | |
| 5,483,441 A | 1/1996 | Scofield | |
| 5,576,949 A | 11/1996 | Scofield et al. | |

(Continued)

FOREIGN PATENT DOCUMENTS

| EP | 0485039 A1 | 5/1992 |
|---|---|---|
| EP | 0705536 A1 | 4/1996 |

(Continued)

OTHER PUBLICATIONS

Bewley et al., A comparison of visual and palpation-based condition scoring systems, American Dairy Science Association Annual Meeting, Abstract W250: 1-26 (2007).

(Continued)

*Primary Examiner* — Gregory J Toatley
*Assistant Examiner* — Iyabo S Alli
(74) *Attorney, Agent, or Firm* — Marshall, Gerstein & Borun LLP; Randall G. Rueth

(57) ABSTRACT

A method of and apparatus for grading a characteristic of an animal is described. The animal is guided to a detection area whereupon an image of the back of the animal is captured. Analysis of the image identifies anatomical points and determines angles at these points. The angles are then used to calculate a grading for a characteristic of the animal. An embodiment is presented for automating the determination of body score condition in dairy cows using seven angles determined at three anatomical points from an image over the back of the cow.

16 Claims, 4 Drawing Sheets

(56) References Cited

U.S. PATENT DOCUMENTS

| | | | |
|---|---|---|---|
| 5,595,444 A | 1/1997 | Tong et al. | |
| 5,625,147 A | 4/1997 | Miles et al. | |
| 5,857,434 A | 1/1999 | Andersson | |
| 5,979,359 A | 11/1999 | Hansson | |
| 6,012,332 A | 1/2000 | Schafer | |
| 6,084,941 A | 7/2000 | Stenstrom | |
| 6,104,294 A | 8/2000 | Andersson et al. | |
| 6,123,451 A | 9/2000 | Schaefer et al. | |
| 6,170,335 B1 | 1/2001 | Clinton | |
| 6,270,462 B1 | 8/2001 | Mottram et al. | |
| 6,375,612 B1 | 4/2002 | Guichon et al. | |
| 6,377,353 B1 | 4/2002 | Ellis | |
| 6,405,672 B1 | 6/2002 | De Mol et al. | |
| 6,418,876 B1 | 7/2002 | Hall et al. | |
| 6,516,746 B2 | 2/2003 | Pratt | |
| 6,532,901 B2 | 3/2003 | Isley et al. | |
| 6,549,289 B1 * | 4/2003 | Ellis | 356/603 |
| 6,553,247 B1 | 4/2003 | Rytky | |
| 6,579,236 B2 | 6/2003 | Pratt | |
| 6,591,221 B1 | 7/2003 | Doyle | |
| 6,616,612 B1 | 9/2003 | Nissila et al. | |
| 6,625,302 B2 | 9/2003 | Kalscheur et al. | |
| 6,643,455 B1 | 11/2003 | Malmstrom | |
| 6,647,919 B2 | 11/2003 | Vijverberg | |
| 7,039,220 B2 * | 5/2006 | Kriesel | 382/110 |
| 7,853,046 B2 * | 12/2010 | Sharony | 382/110 |
| 2002/0010390 A1 | 1/2002 | Guice et al. | |
| 2002/0026112 A1 | 2/2002 | Nissila et al. | |
| 2002/0032375 A1 | 3/2002 | Bauch et al. | |
| 2002/0108576 A1 | 8/2002 | Lely et al. | |
| 2002/0183607 A1 | 12/2002 | Bauch et al. | |
| 2003/0024481 A1 | 2/2003 | Kalscheur et al. | |
| 2003/0035773 A1 | 2/2003 | Totterman et al. | |
| 2003/0072472 A1 | 4/2003 | Haagensen et al. | |
| 2003/0205208 A1 | 11/2003 | Bar-Shalom | |
| 2004/0023612 A1 | 2/2004 | Kriesel | |
| 2005/0005878 A1 | 1/2005 | Zents et al. | |
| 2005/0257748 A1 | 11/2005 | Kriesel et al. | |
| 2006/0000420 A1 | 1/2006 | Davies | |
| 2006/0114109 A1 | 6/2006 | Geissler | |
| 2006/0142654 A1 | 6/2006 | Rytky | |
| 2007/0008150 A1 | 1/2007 | Hassell | |
| 2007/0022967 A1 | 2/2007 | Doyle | |
| 2007/0044732 A1 | 3/2007 | Araki et al. | |
| 2008/0110405 A1 | 5/2008 | Voronin et al. | |
| 2008/0110406 A1 | 5/2008 | Anderson et al. | |

FOREIGN PATENT DOCUMENTS

| | | |
|---|---|---|
| EP | 0743043 A1 | 11/1996 |
| EP | 0755609 A1 | 1/1997 |
| EP | 0923704 A1 | 6/1999 |
| EP | 0941655 A1 | 9/1999 |
| EP | 1212939 A1 | 6/2002 |
| EP | 1344451 A2 | 9/2003 |
| EP | 1396188 A2 | 3/2004 |
| EP | 1537531 A1 | 6/2005 |
| EP | 1848085 A2 | 10/2007 |
| FR | 2693096 A1 | 1/1994 |
| GB | 1421550 A | 1/1976 |
| GB | 2213263 A | 8/1989 |
| GB | 2326944 A | 1/1999 |
| GB | 2335341 A | 9/1999 |
| NL | 1020416 C2 | 10/2003 |
| NL | 1025874 C2 | 10/2005 |
| WO | WO-91/11678 A2 | 8/1991 |
| WO | WO-94/25857 A1 | 11/1994 |
| WO | WO-95/28807 A1 | 10/1995 |
| WO | WO-95/32616 A1 | 12/1995 |
| WO | WO-97/16963 A1 | 5/1997 |
| WO | WO-97/24027 A1 | 7/1997 |
| WO | WO-98/10243 A1 | 3/1998 |
| WO | WO-99/30277 A1 | 6/1999 |
| WO | WO-99/33021 A1 | 7/1999 |
| WO | WO-00/11939 A2 | 3/2000 |
| WO | WO-00/11940 A1 | 3/2000 |
| WO | WO-00/41135 A2 | 7/2000 |
| WO | WO-01/22081 A1 | 3/2001 |
| WO | WO-01/58270 A1 | 8/2001 |
| WO | WO-02/098214 A1 | 12/2002 |
| WO | WO-03/067973 A1 | 8/2003 |
| WO | WO-03/071868 A1 | 9/2003 |
| WO | WO-2004/012146 A1 | 2/2004 |
| WO | WO-2005/070326 A1 | 8/2005 |
| WO | WO-2005/096597 A1 | 10/2005 |
| WO | WO-2005/104930 A1 | 11/2005 |
| WO | WO-2006/022548 A1 | 3/2006 |
| WO | WO-2006/118508 A1 | 11/2006 |
| WO | WO-2007/064202 A1 | 6/2007 |
| WO | WO-2007/071406 A2 | 6/2007 |
| WO | WO-2007/078234 A1 | 7/2007 |
| WO | WO-2007/091246 A2 | 8/2007 |
| WO | WO-2007/107986 A2 | 9/2007 |
| WO | WO-2007/119070 A1 | 10/2007 |
| WO | WO-2008/002137 A1 | 1/2008 |
| WO | WO-2008/007957 A1 | 1/2008 |
| WO | WO-2008/033016 A1 | 3/2008 |
| WO | WO-2008/033022 A2 | 3/2008 |
| WO | WO-2008/048099 A2 | 4/2008 |
| WO | WO-2008/051075 A2 | 5/2008 |

OTHER PUBLICATIONS

Bewley et al., Potential for estimation of body condition scores in dairy cattle from digital images, Journal of Dairy Science, 91: 3439-3453 (2008).

Brandl et al., Determination of live weight of pigs from dimensions measured using image analysis, Computers and Electronics in Agriculture, 15: 57-72 (1996).

British Search Report in corresponding GB0716333.0 dated Dec. 19, 2007.

Coffey et al., A feasibility study on the automatic recording of condition score in dairy cows, Proc. Annu. Meet. Br. Assoc. Anim. Sci., 131 (2003).

Daehnert et al., Direct measure of the depression between ischial tuber (hook) and coxae tuber (pin), as an alternative to change in body condition score in assessing body tissue mobilization, Journal of Dairy Science, 90(6): 3076 (2007).

De Campeneere et al., In vivo estimation of body composition in cattle, Nutrition Abstracts and Reviews, 70: 495-508 (2000).

Defra bcs Guide, Condition scoring of dairy cows, published by Department for Environment Food and Rural Affairs (2001).

Doeschl et al., The relationship between the body shape of living pigs and their carcass morphology and composition, Animal Science, 79: 73-83 (2004).

Edmonson et al., A body condition scoring chart for holstein dairy cows, Journal of Dairy Science, 72: 68-78 (1989).

European Search Report in corresponding EP08252784 dated Nov. 7, 2012.

Ferguson et al, Body condition assessment using digital images, Journal of Dairy Science, 89: 3833-3841 (2006).

Ferguson et al., Principal descriptors of body condition score in holstein cows, Journal of Dairy Science, 77: 2695-2703 (1994).

Ferrell et al., Estimation of body composition of pigs, Journal of Animal Science, 58: 903-912 (1984).

Gregory et al., Relationship between body condition score and body composition in dairy cows, New Zealand Journal of Agricultural Research, 41: 527-532 (1998).

Hady et al., Frequency and precision of body condition scoring in dairy cattle, Journal of Dairy Science, 77: 1543-1547 (1994).

Kristensen et al., Within- and across-person uniformity of body condition scoring in danish holstein cattle, Journal of Dairy Science, 89: 3721-3728 (2006).

Leroy et al., Automatic determination of body condition score of cows based on 2D images, Precision Livestock Farming, 251-255 (2005).

Otto et al., Relationship between body condition score and composition of ninth to eleventh rib tissue in holstein dairy cows, Journal of Dairy Science, 74: 852-859 (1991).

Pompe et al., Automatic body condition scoring of dairy cows: extracting contour lines, Swedish Institute of Agricultural and Environmental Engineering, 243-245 and poster (2005).

Pryce et al., The relationship between body condition score and reproductive performance, Journal of Dairy Science, 84: 1508-1515 (2001).

Schofield et al., Monitoring pig growth using a prototype imaging system, Journal of Agricultural Engineering Research, 72: 205-210 (1999).

Schroder et al., Methods to determine body fat reserves in the dairy cow with special regard to ultrasonographic measurement of backfat thickness, Journal of Dairy Science, 89: 1-14 (2006).

Schwager-Suter et al., Relationship between body condition scores and ultrasound measurements of subcutaneous fat and m. longissimus dorsi in dairy cows differing in size and type, Animal Science, 74: 465-470 (2000).

Waltner et al., Validation of indirect measures of body fat in lactating cows, Journal of Dairy Science, 77: 2570-2579 (1994).

Wright et al., Estimation in vivo of the chemical composition of the bodies of mature cows, Animal Production, 38: 33-44 (1984).

Wu et al., Extracting the three-dimensional shape of live pigs using stereo photogrammetry, Computers and Electronics in Agriculture, 44: 203-222 (2004).

* cited by examiner

METHOD AND APPARATUS FOR THE AUTOMATIC GRADING OF CONDITION OF LIVESTOCK

FIELD OF THE INVENTION

The present invention relates to a method of and apparatus for grading a characteristic of an animal and in particular, though not exclusively, it relates to a method and apparatus for automatic body condition scoring of dairy cows.

BACKGROUND

In farming it is important to monitor the condition of livestock such as beef cattle, dairy cattle, horses, sheep, goats, and swine. Such monitoring provides not only for improving animals' welfare and husbandry but also ensures that the animal is in the best condition for the desired purpose. For beef cattle, for example, it is preferred that the animal has optimum tissue thickening with sufficient marbling to provide the highest quality carcass. In pigs, it is to achieve the desired ratio of lean to fat and determine the target size for slaughter. For dairy cows it is to ensure they are 'fit not fat' at pre-calving (drying off) and calving, while they do not have excessive weight loss at early lactation and at service.

Typically, monitoring is achieved by the farmer walking through the herd and determining their condition by sight. To ensure entire herds are seen, the farmer may view each when they are all consecutively weighed, for instance, where he can note the identity number of an animal which gives concern. This process may be sufficient for small herds where one experienced individual has the time to consider each animal. However, the individual's view is very subjective when overall appearance is being considered. Indeed, overall visual appearance can provide little to no information on weight and/or tissue characteristics. As the condition may dictate the expected price at sale, there is a need to provide a more quantitative analysis.

At a first level the sheep and cattle industries have introduced a form of body condition scoring (BCS). In this way, each animal can be graded according to a scale. For dairy cows, in the UK, the scale often used is from one to five with 0.25 point intervals available also. These are primarily based on viewing the animal from the rear, around the tail head, and from the side, along the loin. Table 1 provides the description of scores as determined by the Department for Environment, Food and Rural Affairs (DEFRA) in the UK.

TABLE 1

Description of Scores in Dairy Cows

| Score | Condition | Detailed Description |
|---|---|---|
| 1 | Poor | Tail Head - deep cavity with no fatty tissue under skin. Skin fairly supple but coat condition often rough. Loin - spine prominent and horizontal processes sharp. |
| 2 | Moderate | Tail Head - shallow cavity but pin bones prominent; some fat under skin. Skin supple. Loin - horizontal processes can be identified individually with ends rounded. |
| 3 | Good | Tail Head - fat cover over whole area and skin smooth but pelvis can be felt. Loin - end of horizontal process can only be felt with pressure; only slight depression in loin. |
| 4 | Fat | Tail Head - completely filled and folds and patches of fat evident. Loin - cannot feel processes and will have completely rounded appearance. |
| 5 | Grossly Fat | Tail Head - buried in fatty tissue, pelvis impalpable even with firm pressure. |

As can be seen from the descriptions provided, this technique of determination requires both visual and tactile assessment. As a result, it requires a skilled individual to perform it and consequently has major disadvantages in respect of subjectivity and time commitment. In effect, these methods rely upon subjective analysis of physical characteristics of an animal and are, therefore, carried out in an intuitive, rather than scientific manner.

For characteristics that cannot be determined from overall visual appearance and/or human tactile assessment, such as tissue depth and quality, imaging systems have been considered. In particular, for beef cattle, accurate and non-destructive methods of determining back fat and total fat have been developed. Such systems are based on imaging into the tissue using ultrasound. These systems have a number of disadvantages. They are not able to predict the tenderness of meat from a slaughtered animal, either before or after slaughter with any significant degree of accuracy. They require a lubricant to be sprayed or coated on the hide prior to contact by the ultrasound probe for the sound waves to reach the tissue. Also, the animal must remain comparatively still for a period of time. Besides the time taken to record each image, quantitative results are not given in real-time.

Consequently a need has been recognized for an automated measurement and analysis system which can provide a quantitative measurement in terms of a grading for a characteristic in livestock.

Accordingly, digital imaging techniques have been developed for assessing body shape, weight, and fatness of pigs. Simple video camera technology is used to capture the image of the back of the pig as the camera looks down upon the pig. Using mathematical algorithms, the outline of the body can be traced and the enclosed area determined. This area measurement has been found to correlate with the weigh platform weight for different breed types. While weight is a good condition indicator for pigs it is of more limited use in cattle where the body part and body composition is of greater consequence on condition.

Digital images of dairy cows have been recorded by taking a visual image of the rear of the animal. Such images are then assessed by an experienced individual who provides graded scores (BCS) in much the same way as if the individual viewed the animal directly. While such a method allows farms on which an experienced individual is not present to acquire the scores, the method suffers from even greater subjectivity problems as only a portion of the cow is viewed and there is no opportunity for tactile assessment.

Attempts to provide an automated system have produced laser scanning devices which model contours or curvatures taken from the rear of the animal at the tail, head and buttocks. These systems have had limited success due to the inherent difficulties in positioning the cow relative to a laser system directed towards its rear in a farm environment. Any movement during image collection also creates errors in the dimensional information collected. As a result poor quality images are typically obtained and some have been found to bear little relevance to the animal when viewed, even though the scoring may have been similar. This may be a result of the fact that the protrusion of bones in a cow, the common markers considered in imaging, may not necessarily mean that she is thin.

SUMMARY

It is thus an object of at least one embodiment of the present invention to provide a method of and apparatus for automated grading of a characteristic of an animal which takes less time, is less stressful on an animal, is more objective and consistent and more cost effective than the prior art.

It is a further object of at least one embodiment of the present invention to provide a method of and apparatus for automated body condition scoring of a dairy cow which takes less time, is less stressful on an animal, is more objective and consistent and more cost effective than the prior art.

According to a first aspect of the present invention there is provided a method of grading a characteristic of an animal, the method comprising the steps:

(a) determining the presence of an animal in an animal detection area;

(b) automatically capturing data from the back of the animal by means of data capture means located above the animal detection area, the data being captured in dependence upon the determination of the presence of an animal;

(c) analyzing the data to determine a plurality of angles identified at points over the back of the animal; and (d) calculating a graded score from a combination of the angles.

In this way, a characteristic which correlates with the angles measured can be given an objective grading. This removes the requirement for a skilled individual, speeds up the determination as the process is automated and is reproducible over an entire herd. The term 'the back of an animal' as used herein is a reference to the anatomical part of the animal containing the spinal column, i.e. the dorsum. Thus, the term 'the back of an animal' as used herein is not intended to refer to the hind or rear of the animal, e.g. the part of the cow comprising its hind legs, as might be viewed from one side of or behind the animal. Thus the data capture means may capture data from above the animal.

Alternatively or in addition, the graded score may be calculated solely in dependence on the plurality of angles. Thus, the graded score may be calculated without reference to a location, such as a static location, spaced apart from the animal.

Alternatively or in addition, the digital capture means may be operative to capture an image in no more than two-dimensions. Thus, there may be no need to capture three-dimensional images. A cost advantage may thereby be provided.

Preferably the data capture means is a digital imaging means which detects radiation reflected or radiated from the surface of the back of the animal. The digital imaging means may comprise a video or still camera. Alternatively the digital imaging means may comprise at least one of: an infra-red based system and a thermal imaging system, which is operative to record thermal images. Thus, there may be no need to illuminate the animal with artificial light in environments where there are low levels of natural light.

Preferably step (c) includes the step of identifying a plurality of anatomical points over the back of the animal. The points may be at the outer edges of the image.

Preferably an angle is determined around each of the points by identifying two lines emanating from the point. The lines will preferably follow profiles on the image. Such lines may be determined by known pattern recognition techniques. It is preferred that the lines are not determined by joining adjacent anatomical points.

Preferably the analysis determines less than five angles on each side of the back of the animal. More preferably the analysis determines three angles on each side of the back of animal. As most animals are symmetric the opposing angles are averaged to provide a set of mean angles.

Preferably a mathematical algorithm is applied to the mean angles to calculate a score. Preferably the score is graded in a range of numerical units.

Preferably the animal detection area is part of a pathway upon which an animal walks. More preferably the pathway is a chute. Alternatively the pathway is a portion of a weighing station.

Preferably an image is captured automatically by a triggering mechanism. The triggering mechanism may be operated by the animal actuating a sensor as it enters the area. Alternatively the triggering mechanism may operate on the closure of gates or other barriers around the animal.

Preferably the method includes the step of removing outliers from the angles measured. More preferably the method includes the step of repeating the steps at periodic time intervals to track the graded score of the animal.

According to a second aspect of the present invention there is provided a method for determining the body score condition in a dairy cow, the method comprising the steps according to the first aspect wherein the characteristic is body condition and the graded score is the body condition score (BCS).

Preferably three anatomical points are used. More preferably the anatomical points are taken at hooks. Alternatively or additionally the points may be taken at locations around the pins or tail head. In an embodiment, the angles are the hook angle, posterior hook angle and tail head depression.

According to a third aspect of the present invention, there is provided apparatus for grading a characteristic of an animal, the apparatus comprising: triggering means operative to determine the presence of an animal in an animal detection area; data capture means located above the animal detection area that is operative to capture data from the back of the animal, the data capture means being operative in dependence on operation of the triggering means; and signal processing means operative to analyze the data and determine a plurality of angles identified at points over the back of the animal and to calculate a graded score from a combination of the angles.

The apparatus may also include an animal detection area located below the image capture means and in cooperation with the triggering means.

Preferably the apparatus also includes means for detecting an identification mark of the animal. In this way the image is automatically referenced against the correct animal for later or consecutive analysis.

Further embodiments of the third aspect of the present invention may comprise one or more features of the first or second aspect of the present invention.

DETAILED DESCRIPTION

An embodiment of the present invention will now be described, by way of example only, with reference to the drawings.

Figure 1:
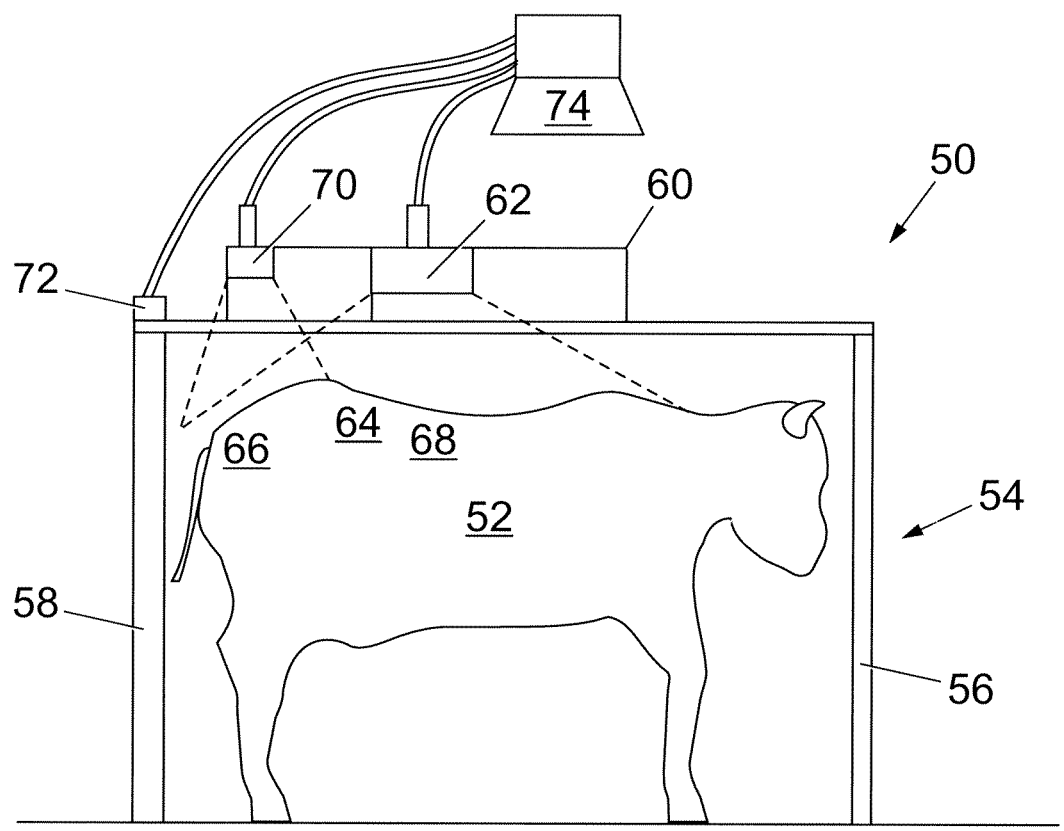
FIG. 1 is a schematic illustration of a graded score being determined on an animal according to a first embodiment of the present invention.

Reference is initially made to FIG. 1 of the drawings which illustrates an apparatus, generally indicated as reference numeral 50, arranged around a dairy cow 52 for determining body condition scoring according to an embodiment of the present invention. Apparatus 50 comprises a weigh station, generally indicated by reference numeral 54. This is as known in the art where a cow 52 is guided into the station 54. Front gates 56 are initially closed so that the cow enters and is guided towards the gates 56. The rear gates 58 are closed behind the cow to restrain the cow in the station 54. In this location the cow 52 has little movement and thus this may be defined as the animal detection area.

Mounted on a frame 60 above the stationary weigh station 54 is a digital camera 62. Camera 62 is positioned to provide a field of view over a majority of the back 64 of the cow 52 and includes the tail head region 66 and the loin region 68. The camera is thus pointed downwards towards the cow's back and remains stationary at all times. Of course, other embodiments may include a camera or other image capture device that compensates (by movement or other means) for the cow's movement in the weigh station 54 to provide a clear or otherwise usable image for the methods described herein. Though a digital camera is illustrated any data capture means may be used which can be positioned away from the animal a sufficient distance so as not to interfere with the animal's travel and location in the detection area. In a further embodiment a thermal image is captured which improves the contrast on the image when the apparatus is used in low light environments. The thermal image is captured either by an infra-red (IR) camera, such as a Charge Coupled Device (CCD) IR camera, or by a thermal imaging system, such as a microbolometer system.

Also located on the frame 60 is a second camera 70. The second camera 70 is directed on the rump of the animal to pick up an identification number generally marked on the animal in this location for dairy cows. It will be appreciated that any instrument capable of reading an identification mark or tag from an animal can be located in the apparatus in place of this camera. For example, if an animal is radio tagged, a radio transmitter and receiver can be located about the frame 60. As with the image capture apparatus 62 the second camera is mounted outside the path of the animal and does not have to locate near or on the animal to operate.

Yet further, a triggering mechanism 72 is located on the weigh station 54. In this embodiment the triggering mechanism is located at the rear gate 58 so that when the gate 58 is closed, the mechanism 72 is actuated and sends a signal to the digital camera 62 to collect an image of the back of the animal. While this is an effective automated triggering mechanism for a weigh station, it will be appreciated that other triggering mechanisms could be used. For example, a detector could be mounted on the front gate 54 which is triggered when the cow contacts the front gate. A weight sensor could be located on the floor of the detection area, or a motion sensor could be located so as to detect animal movement in the detection area.

The two cameras 62, 70 and the triggering mechanism 72 are all connected to a PC 74. A microprocessor could alternatively be used. This could be mounted on the frame and the results wirelessly transmitted to a PC in a clean environment. Alternatively a handheld monitor including a Field-Programmable Gate Array (FPGA) may be useable near the station to provide immediate results to herdsmen. The PC is programmed to detect the triggering signal and operate the digital camera 62. The captured data is transmitted back to the PC where software installed on the PC carries out a number of steps. These steps are illustrated in the flow chart of FIG. 2.

Figure 2:
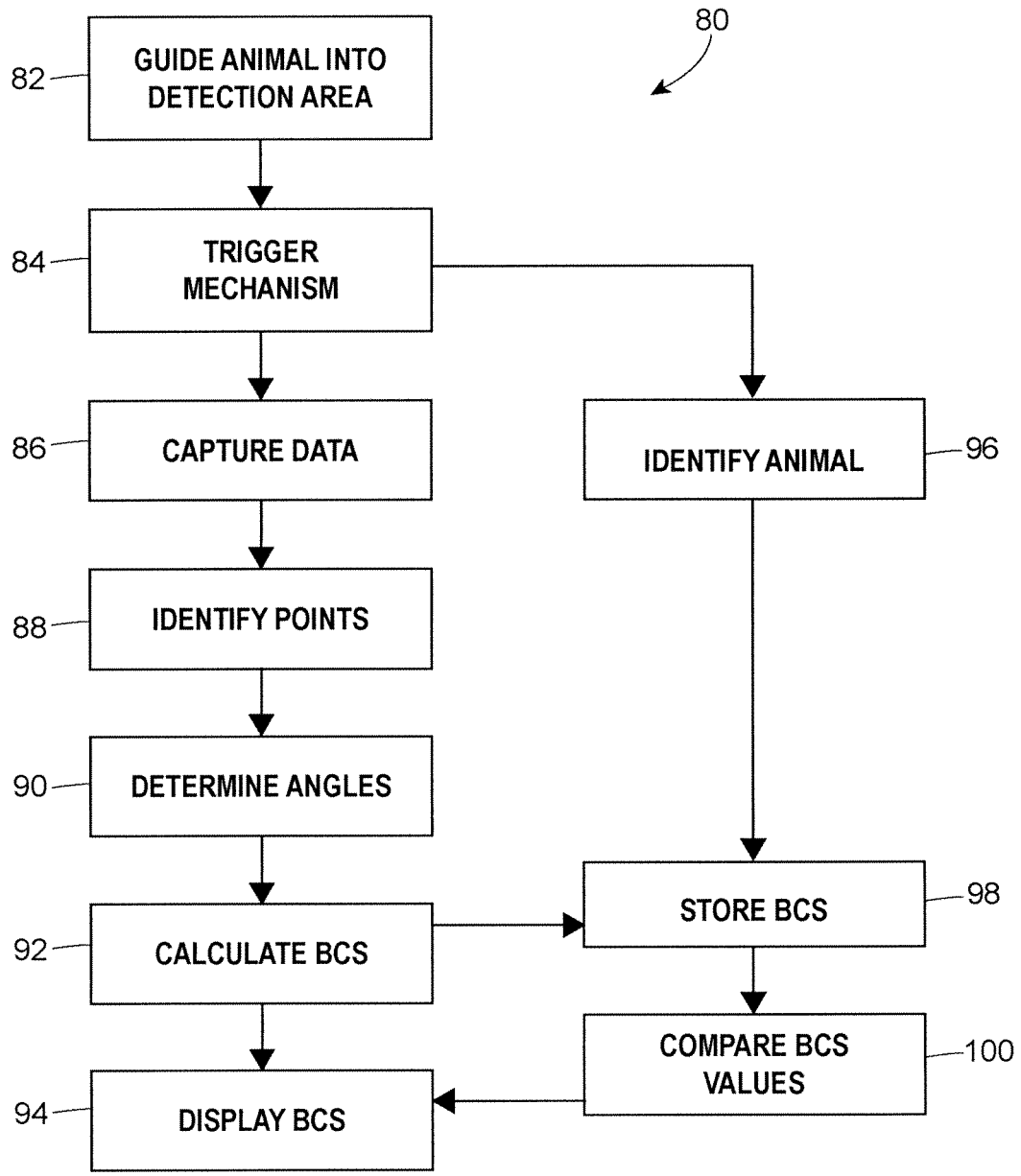
FIG. 2 is a flow chart of the methodology according to an embodiment of the present invention.

Reference is now made to FIG. 2 which illustrates the methodology, generally indicated by reference numeral 80, according to an embodiment of the present invention. A first step 82 is ensuring the animal 52 enters the detection area 54. In the case of dairy cows, the weigh station 54 could be placed at the exit alley from the parlor. When the rear gates 58 of the weigh station 54 close after cow entry, the triggering mechanism 72 is activated 84 and an image is collected on the digital camera 62 as in step 86. The image may be black and white which could improve contrast.

Figure 3:
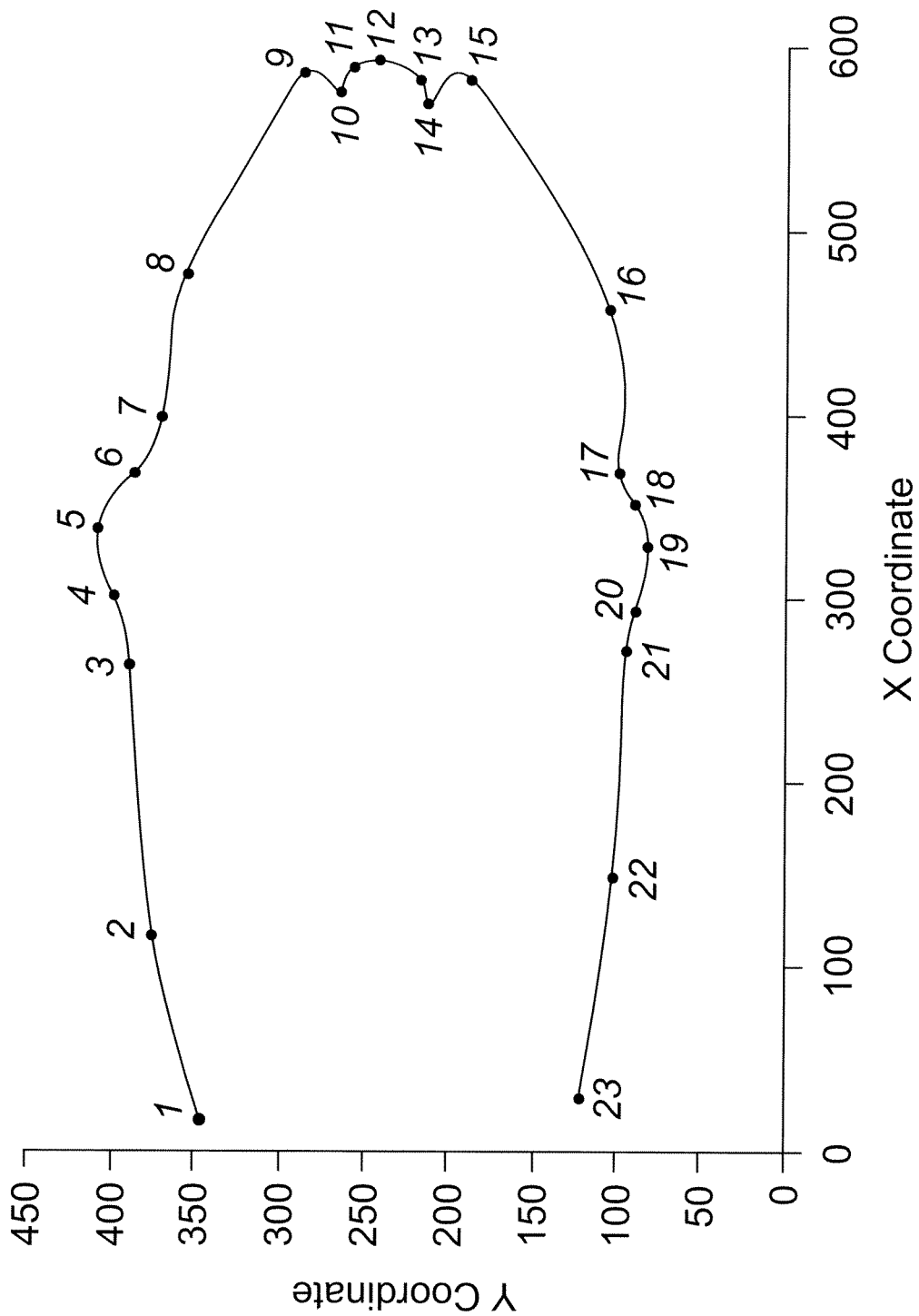
FIG. 3 is an outline of a portion of the back of a cow with anatomical points located thereon.

The image is sent to the PC for data processing. The first step 88 in the process is to identify anatomical points corresponding to identifiable features. For a dairy cow 52, twenty three anatomical points are identifiable. These are illustrated in FIG. 3 where a sample outline of an image is provided with the 23 points identified thereon. These points (1)-(23) are referred to as (1) Left Forerib, (2) Left Short Rib Start, (3) Left Hook Start, (4) Left Hook Anterior Midpoint; (5) Left Hook, (6) Left Hook Posterior Midpoint, (7) Left Hook End, (8) Left Thurl, (9) Left Pin, (10) Left Tailhead Nadir, (11) Left Tailhead Junction, (12) Tail, (13) Right Tailhead Junction, (14) Right Tailhead Nadir, (15) Right Pin, (16) Right Thurl, (17) Right Hook End, (18) Right Hook Posterior Midpoint, (19) Right Hook, (20) Right Hook Anterior Midpoint, (21) Right Hook Start, (22) Right Short Rib Start, and (23) Right Forerib. These points 1-23 cover the general regions (i.e., hooks, pins, and tail head) as described in Table 1.

It will be recognized that with the exception of the tail (point 12, FIG. 3), the points are symmetrical across the back of the animal and match on the left and right sides respectively. The computer program identifies these points and stores them as coordinates, as shown in FIG. 3. Some editing of the data may be done at this time. For example, if the hooks are unidentifiable, the image may be considered as collected in error as it is unrepresentative of a cow. Such an image may be deleted and not used.

Figure 4:
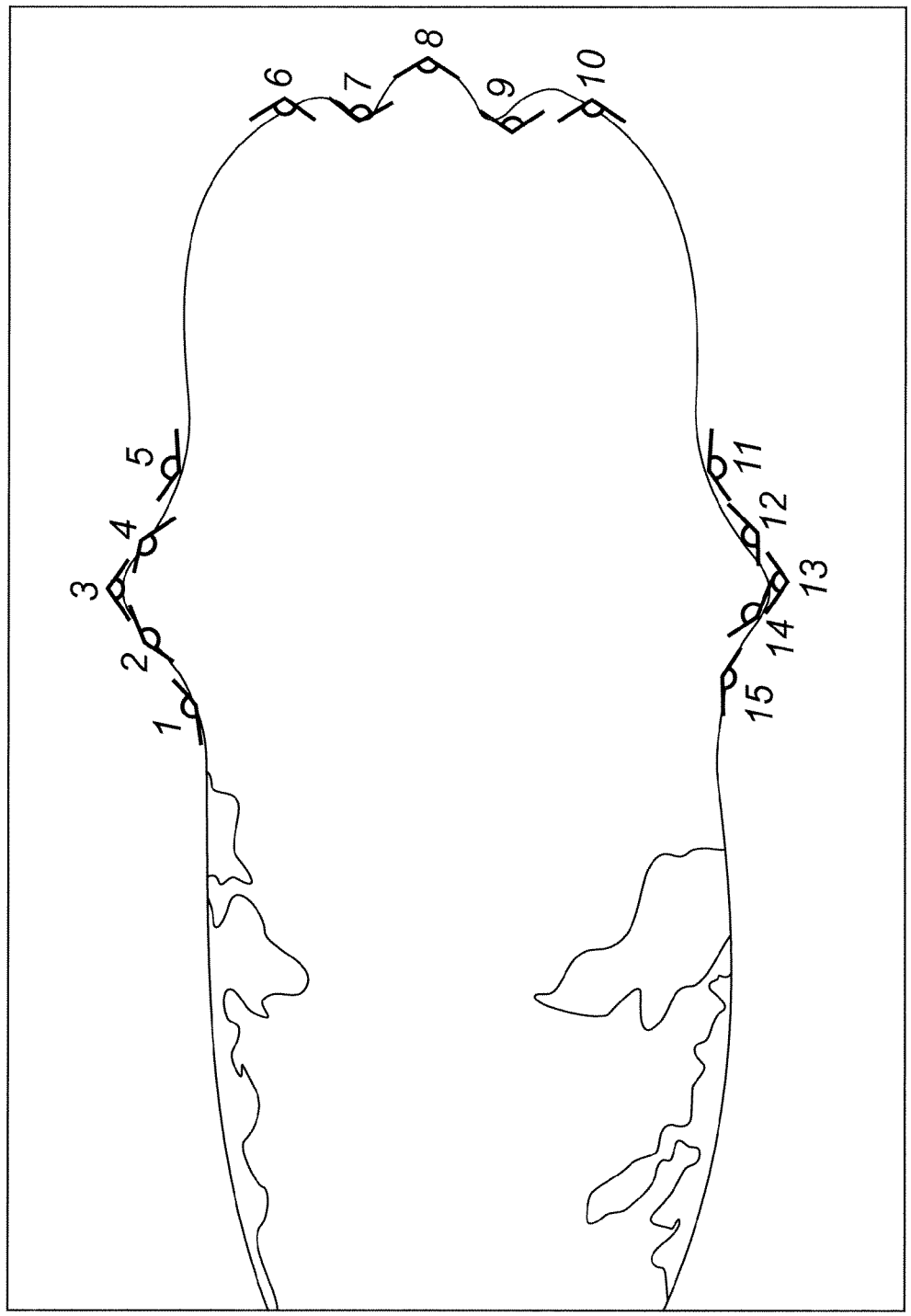
FIG. 4 is an outline of a portion of a back of a cow illustrating the angles identified for determination.

With the points identified 88, angles are then established 90 at these points which follow the profile of the image emanating from the respective point (1)-(23). These may be considered as reflecting the shape of the contour of the cow 52. Reference is now made to FIG. 4 of the drawings which illustrate the angles 1-15 calculated using the most appropriate key anatomical point (1)-(23). In FIG. 4, the angles are, 1—Left Hook Anterior Angle, 2—Left Hook Anterior Curvature, 3—Left Hook Angle, 4—Left Hook Posterior Angle, 5—Left Hook Posterior Curvature, 6—Left Thurl to Pin Angle, 7—Left Tailhead Depression, 8—Tailhead Angle, 9—Right Tailhead Depression, 10—Right Thurl to Pin Angle, 11—Right Hook Posterior Angle, 12—Right Hook Posterior Curvature, 13—Right Hook Angle, 14—Right Hook Anterior Curvature, 15—Right Hook Anterior Angle. Now, by taking the mean of opposing angles, seven composite angles are determined 90. Again editing may be done, for example, by calculating a coefficient of variation to each of the composite angles and removing outliers exceeding predetermined cut-off values. This is done to determine if the opposing angles are grossly different and if so, to remove them. If they are different, this may be indicative of the animal standing diagonally within the weigh station, a poor quality image, or gross errors in the point identification.

The body condition score (BCS), as identified in Table 1, is calculated 92 using the angles and a regression analysis technique where coefficients had been determined from earlier studies on cows. In some embodiments, only the Hook Posterior Angle 5,11 Hook Angle 3,13 and Tailhead Depression 7,9 are considered in the calculation. It has been shown that a BCS calculation on these angles provides a high correlation to the BCS determined by skilled individuals using the scoring of Table 1. In one embodiment, angles in the hook region are used. More specifically, the Hook Posterior Angle 5,11 and Hook Angle 3,13 are used in accordance with:

$$yij = \mu + Cowi + \beta 1 HAij + \beta 2 PHAij + \beta 3 (HA \times PHA)ij + eij$$

where yij is the jth USBCS (Edmonson/Ferguson system body condition score) or UKBCS (Lowman system body condition score) for cow i; μ is the intercept; Cowi is the ith cow; β1, β2 and β3 are regression coefficients corresponding to co-variables average hook angle HAij, average posterior hook angle PHAij, and interaction of hook angle and posterior hook angle HA×PHA)ij respectively; and eij is residual error.

In another embodiment, angles in the rump region are also used. More specifically, Hook Posterior Angle 5,11 Hook Angle 3,13 and Tailhead Depression 7,9 were used in accordance with:

$$yij = \mu + Cowi + \beta 1 HAij + \beta 2 PHAij + \beta 3 (HA \times PHA)ij + \beta 4 TDij + \beta 5 (PHA \times TD)ij + eij$$

where β4 and β5 are regression coefficients corresponding to co-variables average tailhead depression TDij and interaction of average posterior hook angle and average tailhead depression (PHA×TD)ij respectively.

The calculated BCS can be automatically displayed 94. The value is also stored in a memory 98 along with the ID of the animal which has been determined 96 from the camera 62 and appropriate software in the PC. The individual angle measurements may also be stored. This allows BCS measurements made over periods of time to be compared 100 and displayed 94 for analysis. As the BCS does not generally change dramatically over short periods of time (i.e. days), it would be possible to initially collect BCS measurements on an animal over that period and compare these to provide a mean value which can then be tracked over a longer time period.

The principal advantage of the present invention is that it provides a method for obtaining a graded score for a characteristic of an animal which can be objective as it can be entirely automated. Consequently this provides the advantages of reducing the time taken to score the animal and is less stressful on the animal as it can be done non-invasively.

A further advantage of at least one embodiment of the present invention is that it provides an automated method and apparatus for determining body condition scoring in dairy cows which only requires determination of three anatomical points on the cow and correlates well with known body condition scoring techniques.

Various modifications may be made to the invention herein described without departing from the scope thereof. For example, a combination of images taken from both the back and rear may used in order to determine more identifiable anatomical points. Additionally the process could be combined with a contact imaging system like ultrasound to provide for scoring of tissue characteristics instead of hose based primarily on the overall visual appearance of the animal.

What is claimed:

1. A method of grading a characteristic of an animal, the method comprising:
   a) determining the presence of an animal in an animal detection area;
   b) capturing an image from a back of the animal by means of image capture means located above the animal detection area, the image being captured in dependence upon the determination of the presence of an animal;
   c) analyzing, via a computing device the image to determine a plurality of angles identified at points over the back of the animal; and
   d) calculating, via the computing device a graded score from a combination of the angles;
   wherein analyzing the image to determine the plurality of angles identified at points over the back of the animal includes identifying a plurality of anatomical points over the back of the animal at the outer edges of an outline of the image of the back of the animal.

2. A method as claimed in claim 1 wherein the image capture means is a digital imaging means that detects radiation, which is one or more of reflected and radiated from the surface of the back of the animal.

3. A method as claimed in claim 2 wherein the digital imaging means may comprise a digital camera.

4. A method as claimed in claim 2 wherein the digital imaging means comprises one or more of: an infra red based system; and a thermal imaging system, which is operative to record thermal images.

5. A method as claimed in claim 1 wherein an angle is determined around each of the points by identifying two lines emanating from the point.

6. A method as claimed in claim 1 wherein the analysis comprises determining less than five angles on each side of the back of the animal.

7. A method as claimed in claim 1 wherein the analysis comprises determining three angles on each side of the back of animal.

8. A method as claimed in claim 1 wherein a mathematical algorithm is applied to the angles to calculate a score.

9. A method as claimed in claim 1 wherein the animal detection area is part of a pathway upon which an animal walks.

10. A method as claimed in claim 9 wherein the pathway is a portion of a weighing station.

11. A method as claimed in claim 1 wherein an image is captured in dependence upon operation of a triggering mechanism, which operates when the animal enters the animal detection area.

12. A method as claimed in claim 1 wherein the animal is a dairy cow, the characteristic is body condition, and the graded score is the body condition score (BCS).

13. A method as claimed in claim 12 wherein three anatomical points are used on each side of the cow's back.

14. A method as claimed in claim 13 wherein the angles are the hook angle, posterior hook angle and tail head depression.

15. Apparatus for grading a characteristic of an animal, the apparatus comprising: triggering means operative to determine the presence of an animal in an animal detection area; image capture means located above the animal detection area that is operative to capture an image from a back of the animal, the image capture means being operative in dependence on operation of the triggering means; signal processing means operative to analyze the image and determine a plurality of angles identified at points over the back of the animal and to calculate a graded score from a combination of the angles; wherein signal processing means operative to analyze the image and determine a plurality of angles identified at points over the back of the animal includes identifying a plurality of anatomical points over the back of the animal at the outer edges of an outline of the image of the back of the animal.

16. An apparatus as claimed in claim 15 wherein the apparatus comprises means for detecting an identification mark on animal.

* * * * *